Patented Dec. 2, 1952

2,620,321

UNITED STATES PATENT OFFICE 2,620,321

METHOD OF MAKING PHENOL-FORMALDEHYDE RESIN AND PRODUCTS THEREOF

Paul G. Schrader and Alexander M. Partansky, Antioch, Calif., assignors to The Dow Chemical Company, Midland, Mich., a corporation of Delaware No Drawing. Application April 18, 1951,
Serial No. 221,727

2 Claims. (Cl. 260—29.3)

The invention relates to improvements in a method of making phenol-formaldehyde resins of the type which is useful in the manufacture of adhesives for plywood and for similar purposes.

In our prior application Serial No. 110,466, filed August 15, 1949, we have disclosed certain new adhesives for plywood, which are prepared by mixing two differently prepared phenol-formaldehyde condensation products, such condensation products being designated therein, respectively, as a "catalytic" resin and a "base" resin. The catalytic resin is prepared by reacting an aqueous mixture of a phenol, formaldehyde and alkali metal hydroxide at a condensation temperature below 70° C. to form a water-soluble resin having a viscosity in the range of 10 to 350 centipoises when measured at 25° C. in aqueous solution of 30 per cent solids content. The reacting materials are employed in the proportions of 2.25 to 3.5 mols of formaldehyde and 0.5 to 1.0 mol of alkali metal hydroxide, per mol of the phenol. The reaction product, when examined in an electron-microscope, exhibits a peculiar "nucleated" structure, which is characterized by the presence of numerous well-defined small dense spherical nuclei, that appear to be active condensation centers. This type of structure is absent in the aqueous phenol-formaldehyde condensation products prepared with alkaline catalysts in the usual way by cooking under reflux at or near the boiling point of the reaction mixture, even when the reacting materials are present within the ranges of proportions mentioned above. Such conventional type low molecular weight condensation products, prepared by usual methods, are hereinafter sometimes referred to as being "non-nucleated," in distinction from the above-mentioned nucleated catalytic resins.

The non-nucleated base resin, with which such nucleated catalytic resin is mixed to form an adhesive, is a usual low molecular weight condensation product prepared by cooking under reflux an aqueous mixture of a phenol, formaldehyde and alkali metal hydroxide in the proportions of 1.4 to 3.0 mols of formaldehyde and 0.5 to 1.0 mol of alkali metal hydroxide per mol of the phenol to a viscosity of about 200 to 500 centipoises at a resin solids content of about 30 per cent. The prior application shows that a mixture of the above-mentioned catalytic resin and base resin, containing upwards of about 10 per cent of the catalytic resin, forms an adhesive which is not only effective for gluing "dry" veneers, having up to 3 per cent moisture, but also for gluing undried or "wet" veneers containing up to about 10 per cent of moisture. These composite adhesives are superior to those previously known to the art in their ability to form a firm glue bond with wet veneers, for which usual commercial phenol-formaldehyde type of adhesives are unsatisfactory.

A disadvantage in the commercial production of such composite adhesives is that a long time is required for the preparation of the nucleated catalytic resin, on the order of 30 to 60 hours or more of cooking at a temperature in the range of 55° to 65° C. It is desirable to discover a way of shortening the reaction time materially. A principal object of the invention, therefore, is to provide a modified procedure for carrying out the reaction for preparation of such catalytic resin, whereby a condensation product having the desired characteristic nucleated structure may be obtained in a much shorter time.

We have now found that by using a mixture of alkali metal hydroxide and alkali metal carbonate, instead of the hydroxide alone, for making the catalytic resin, the reaction time at temperatures between 55° and 70° C. is shortened to a fraction of that required when the hydroxide alone is used. In the mixture of alkali metal hydroxide and carbonate the molar proportion of the carbonate should not materially exceed that of the hydroxide, and is preferably between 10 and 40 per cent of the total. Such substitution of the carbonate for a portion of the hydroxide enables the reaction time to be reduced to as little as about 4 to 10 hours.

The catalytic resin prepared at the low condensation temperature as aforesaid with a mixture of alkali metal hydroxide and carbonate, in the stated proportions, when mixed with the base resin, produces a composite adhesive having similar and comparable properties for gluing wet veneers as those made with a catalytic resin prepared with the hydroxide alone. The use of the carbonate alone, however, or of mixtures with the hydroxide in which the carbonate is in substantial excess, does not yield a catalytic resin that is capable of forming a satisfactory composite adhesive.

The invention is illustrated by the following examples, which, however, are not to be understood to imply any limitation within the scope of the appended claims.

EXAMPLE 1

For the catalytic resin an aqueous mixture was prepared from phenol, 37 per cent formaldehyde solution and 50 per cent sodium hydroxide solution, containing phenol—273 gm. (2.91 mols), $CH_2O$—287 gm. (8.7 mols) and NaOH—58.2 gm. (1.45 mols). To the mixture was added 61.6 gm. (0.58 mol) of $Na_2CO_3$. Such mixture then contained the reactants in the molar proportions, based on phenol in the order named, of 1.0 : 3.0 : 0.5 : 0.2

The mixture was heated at 60° C. for 2 hours, when sufficient water (733 cc.) was added to dilute the whole to approximately 30 per cent resin solids content. Heating at 60° C. was then continued for an additional 7 hours, 45 minutes, to a final viscosity of 140 centipoises measured at 25° C. Total heating time was 9.75 hours.

A base resin was prepared from a mixture of phenol—950 gm. (10.11 mols), 37 per cent aqueous formaldehyde solution—1516 gm. (18.7 mols) and 50 per cent NaOH solution—760 gm. (9.5 mols), in which the mol ratios, based on phenol, were 1.0 : 1.85 : 0.94. The mixture was heated to boiling under reflux for 6 hours, diluted with 904 cc. water to a 30 per cent resin solids content, and refluxed for 1 hour longer, to a final viscosity of 400 centipoises, measured at 25° C.

A composite adhesive was prepared by mixing 20 parts by weight of the above catalytic resin with 80 parts of the above base resin and 15 parts of walnut shell flour. Plywood test specimens were prepared with the adhesive from Douglas fir veneers containing 8 to 9 per cent moisture. The plywood assembly was laid up with 5 plies 12" x 12", the center ply being $\frac{1}{10}$" and the other four plies $\frac{1}{8}$" thick, only the three inner plies being glued together with the adhesive applied in amount of 12 grams between the plies (equivalent to 30 lbs. per 1000 sq. ft.), with assembly time of 10 minutes. The 5-ply assembly was pressed at 175 lbs. sq. in. (p. s. i.) for 6 minutes at 270° F. Separate glued specimens were tested for shear strength in three ways, viz., (1) on the untreated dry specimen, (2) after 20 hours' soaking in cold water, and (3) after 4 hours' immersion in boiling water. The ruptured surface of each specimen was examined and the per cent of wood failure was estimated, to show what portion of the break was caused by split in the wood instead of by cleavage of the glue from the wood. The values for shear strength in pounds per square inch and the per cent wood failure are shown in the following table. For comparison the table also shows corresponding values obtained by similar procedure except that the catalytic resin employed was prepared with sodium hydroxide as the sole alkali, as described in our prior co-pending application, by heating for 37 hours.

Table

| Specimen | Catalytic Resin, Mol. Alkali | | Shear, Lbs./ Sq. In. | Percent Wood Failure |
|---|---|---|---|---|
| | NaOH | $Na_2CO_3$ | | |
| (1) Untreated | 0.5 | 0.2 | 270 | 92 |
| Do | 0.5 | | 251 | 98 |
| (2) 20 Hrs. Cold Water | 0.5 | 0.2 | 225 | 95 |
| Do | 0.5 | | 240 | 87 |
| (3) 4 Hrs. Boiling Water | 0.5 | 0.2 | 177 | 95 |
| Do | 0.5 | | 204 | 96 |

EXAMPLE 2

In similar manner to that described in Example 1, other catalytic resins were prepared at reaction temperature of about 60° C., varying the amounts and ratio to each other of sodium hydroxide and sodium carbonate, as follows:

Table

| | 1 | 2 | 3 | 4 |
|---|---|---|---|---|
| Phenol, Mols | 1.0 | 1.0 | 1.0 | 1.0 |
| $CH_2O$, Mols | 3.0 | 3.0 | 3.0 | 3.0 |
| NaOH, Mols | 0.3 | 0.7 | 0.5 | 0.3 |
| $Na_2CO_3$, Mols | 0.1 | 0.1 | 0.25 | 0.3 |
| Time, Hrs.:Min | 9:55 | 14:50 | 9:05 | 7:35 |
| Viscosity, Cps | 140 | 165 | 100 | 125 |

Each of the above resins, when mixed with the base resin of Example 1 in proportion by weight of 20 parts of the catalytic resin to 80 parts of the base resin, formed water-soluble or miscible composite adhesives which were satisfactory for gluing plywood made from wet veneers (8 to 9 per cent moisture) as well as dry veneers (0 to 3 per cent moisture).

Similar results may be secured with the use of mixtures of potassium hydroxide and potassium carbonate in the same proportions. Instead of phenol itself, other reactive phenols may be used, such as meta-cresol, which contain no substituents in either the ortho or para position to the hydroxyl group, or mixtures of phenol therewith, including technical grades consisting principally of such reactive phenols.

Other proportions of the several reactants may be used in accordance with the invention to produce nucleated catalytic resins having equivalent properties for use in composite adhesives as described herein, provided that the proportions chosen shall be within the range of 2.25 to 3.5 mols formaldehyde per mol of the phenol, and 0.4 to 1.0 mol of a mixture of alkali metal hydroxide and alkali metal carbonate per mol of the phenol, the carbonate comprising from 5 to 50 mol per cent of such mixture. The condensation products so prepared are characterized by having a nucleated structure similarly to those prepared with use of alkali metal hydroxide alone.

We claim:

1. The method of making a nucleated water-soluble phenolic resinous composition which comprises forming an aqueous mixture of a reactive phenol containing no substituents in positions ortho or para to the hydroxyl group with from 2.25 to 3.5 molar proportions of formaldehyde and from 0.4 to 1.0 molar proportion of a mixture of alkali metal hydroxide and alkali metal carbonate containing from 5 to 50 mol per cent of such carbonate, and heating the same at a temperature between 55° and 70° C. to a viscosity of from 10 to about 350 centipoises, measured at a temperature of 25° C. and a resin solids content of 30 per cent.

2. The method of making a nucleated water-soluble phenolic resinous composition, which comprises forming an aqueous mixture of phenol with from 2.25 to 3.5 molar proportions of formaldehyde and from 0.4 to 1.0 molar proportion of a mixture of sodium hydroxide and sodium carbonate containing from 5 to 50 mol per cent of such carbonate, and heating the same at a temperature between 55° and 70° C. to a viscosity of from 10 to about 350 centipoises, measured at a temperature of 25° C. and a resin solids content of 30 per cent.

PAUL G. SCHRADER.
ALEXANDER M. PARTANSKY.

No references cited.